US006710248B1

(12) United States Patent
Foschino et al.

(10) Patent No.: US 6,710,248 B1
(45) Date of Patent: Mar. 23, 2004

(54) CONNECTING ARRANGEMENT FOR ELECTRIC OR ELECTRONIC SYSTEMS, IN PARTICULAR TELEPHONE SYSTEMS

(75) Inventors: Maurizio Bartolomeo Foschino, Agrate Brianza (IT); Matteo Massimo Foschino, Agrate Brianza (IT)

(73) Assignee: CMS Costruzioni Meccaniche Sestesi, Milan (IT)

( * ) Notice: Subject to any disclaimer, the term of this patent is extended or adjusted under 35 U.S.C. 154(b) by 0 days.

(21) Appl. No.: 10/129,855

(22) PCT Filed: Nov. 13, 2000

(86) PCT No.: PCT/IT00/00460

§ 371 (c)(1),
(2), (4) Date: Sep. 13, 2002

(87) PCT Pub. No.: WO01/39565

PCT Pub. Date: May 31, 2001

(30) Foreign Application Priority Data

Nov. 29, 1999 (IT) ........................................ MI99A2488

(51) Int. Cl.[7] ................................................ H02G 3/18

(52) U.S. Cl. .................... 174/65 R; 174/65 G; 174/60; 174/64; 248/56

(58) Field of Search ............................ 174/65 G, 65 R, 174/135, 60, 64, 88 R, 96; 16/2.1; 248/56

(56) References Cited

U.S. PATENT DOCUMENTS

| | | | | | |
|---|---|---|---|---|---|
| 5,245,131 | A | * | 9/1993 | Golden et al. | 174/65 R |
| 5,765,698 | A | | 6/1998 | Bullivant | |
| 5,788,087 | A | | 8/1998 | Orlando | |
| 5,984,720 | A | | 11/1999 | Milner et al. | |
| 6,365,829 | B1 | * | 4/2002 | Kam | 174/46 |

* cited by examiner

*Primary Examiner*—Dhiru R Patel
(74) *Attorney, Agent, or Firm*—Katten Muchin Zavis Rosenman

(57) ABSTRACT

A connecting structure for electric or electronic systems comprising a bracket for directing cables, on which is installed at least one plate supporting connectors. The at least one plate may be fastened, released and moved with respect to the bracket by means of housing slots open in the bracket, rotating hinges connecting the plate to the bracket and means for rotatably lifting the plate with respect to the bracket for servicing. Two plates are preferably installed on each bracket.

10 Claims, 12 Drawing Sheets

CONNECTING ARRANGEMENT FOR ELECTRIC OR ELECTRONIC SYSTEMS, IN PARTICULAR TELEPHONE SYSTEMS

CROSS-REFERENCE TO RELATED APPLICATIONS

This invention refers to a connecting structure for electric or electronic systems which is an improvement of the structure described and depicted in the Italian utility model Patent No. 00220521 filed on Dec. 10, 1990 at the name of the present applicant.

BACKGROUND OF THE INVENTION

The structure described in the above mentioned utility model essentially consists of a support plate, as shaped as two steps, to which are fastened, within proper holes open in the planes of the two steps, fixed connectors (usually of female kind), and of a cable directing bracket useful to support the plate itself and to direct cables connected to fixed and/or movable connectors present around the plate.

Such a structure is certainly of great use in its field, however an increasing demand of compactness of the systems compels to ask for solutions which for the same bracket encumbrance:

1. increase, at least doubling, the number of plates connected to any bracket;
2. increase the most the possible the number of seats for fixed connectors on any plate, always allowing any manipulation of the connectors and associated cables.

BRIEF SUMMARY OF THE INVENTION

The above mentioned objects are met by a structure according to the present invention comprising an essentially rectangular bracket provided with:

- two superimposed windows for directing cables connected to connectors;
- two slot pairs substantially parallel to one of the longest sides of the bracket for engaging two half-cylindrical hinges present on the longest side of any plate, supporting the connectors, adjacent the bracket; and
- at least means for fastening at will any plate to the cable-directing bracket.

Specifically, the means for fastening any plate to the cable-directing bracket are two in number and are externally arranged with respect to two slot pairs provided for engaging the hinges.

More specifically, the means for fastening any plate to the bracket consist of screws, engaged in threaded members integral with the bracket, anyone crossing a hole, as shaped as an oblong slot in a finger of the plate adjacent the bracket.

Preferably, the screws support, between their head and the fingers of the plate, a spring, resting against a washer, operating as a resilient return closing the plate against the bracket.

In addition, besides the means to fasten any plate to the bracket, are provided at least means to lift the plate with respect to the bracket to expose the area under the plate, usually hidden, in order to promote checking and servicing thereof.

As a variation, it is possible to provide just one means operating, in a first direction, as plate lift with respect to the bracket and, in an opposed direction, as fastener of the plate to the bracket.

As an alternative, the means to fasten the plate to the bracket can be spring tang means fastened to the bracket and interfering with slots in the plate.

As a further alternative, the means to fasten the plate to the bracket can be latching means arranged on the bracket and engaging at least a shaped hole in the plate.

As a variation, the means fastening the plate to the bracket can be latching means arranged on the bracket and engaging a relief arranged on the plate.

As a further variation, the means for fastening the plate to the bracket can be latching means arranged on the plate and engaging a relief arranged on the bracket.

BRIEF DESCRIPTION OF THE DRAWINGS

The features of the invention will be defined in the claims concluding the present description. However other features and advantages will be detailed in the description of some specific embodiments, not to be considered as limiting the invention, provided with the enclosed drawing, wherein:

DETAILED DESCRIPTION OF THE INVENTION

Figure 1:
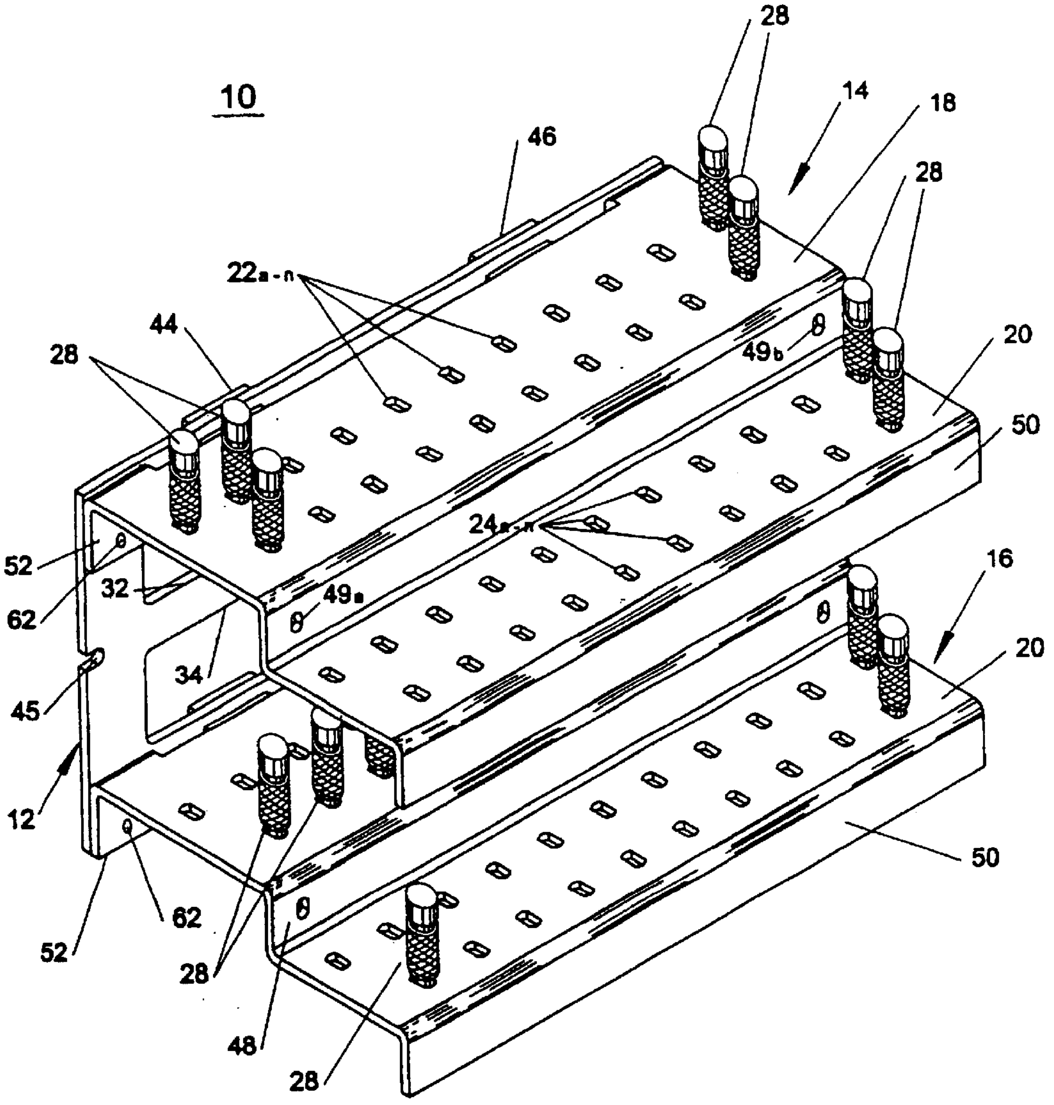
FIG. 1 is a perspective view of a connection structure, according to the present invention, comprising a cable directing bracket and two plates supporting connectors.

With reference to the FIGS. 1 to 5, it is seen that a connecting structure 10 according to the invention consists of a cable directing bracket 12 supporting two plates 14 and 16 perpendicular with respect to the bracket 12 and each provided with two planes 18 and 20 having openings 22$_{a-n}$ and 24$_{a-n}$ suited to house fixed connectors for cables (not shown), in which are inserted movable connectors 28.

Figure 2:
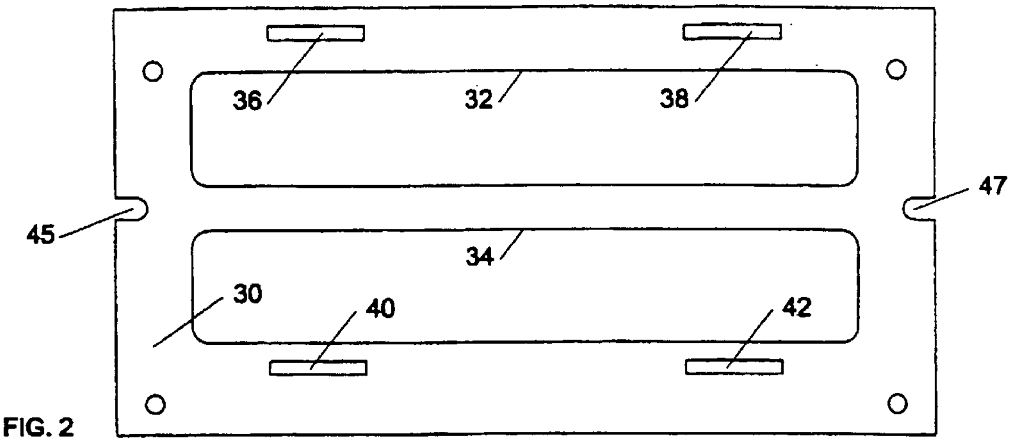
FIG. 2 is a front view of the only cable-directing bracket.
Figure 3:
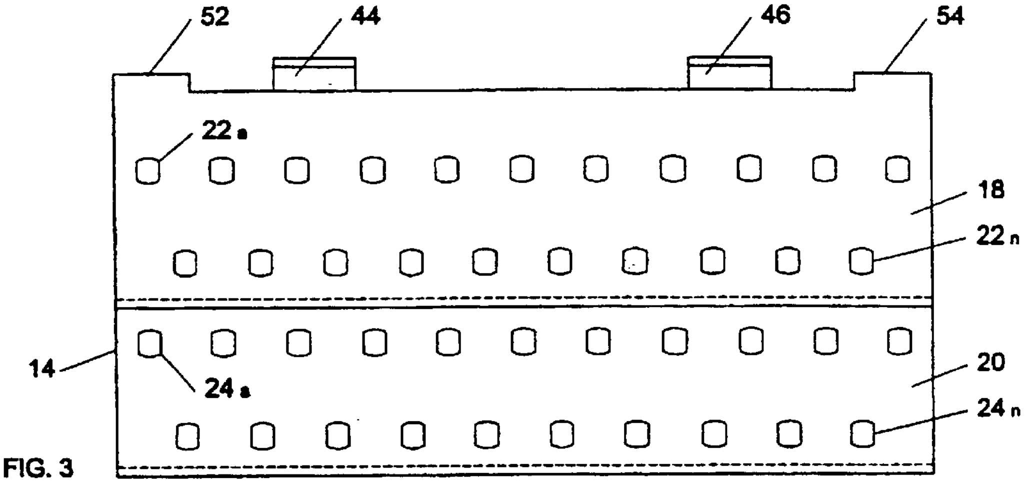
FIG. 3 is a top view of a connector supporting plate according to the present invention.
Figure 4:
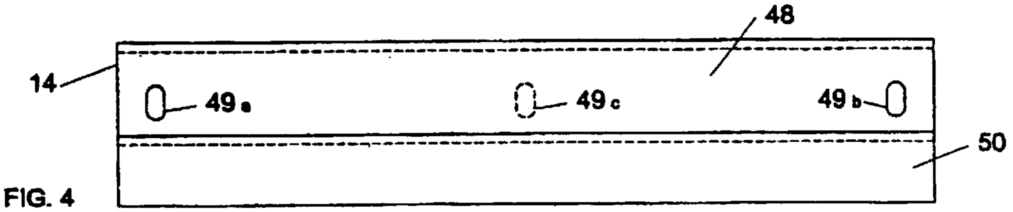
FIG. 4 is a front view of the same plate.
Figure 5:
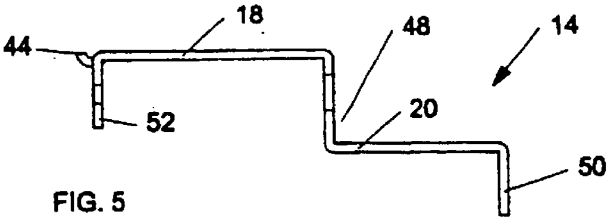
FIG. 5 is a side profile view of the same plate.

Looking specifically at FIGS. 2 and 3, it is seen that any bracket 12 consists of a rear wall 30 provided with two large rectangular windows 32 and 34, for passing cables, which can be either whole windows or subdivided windows. Further, the rear wall 30, which can be either smooth for thicker brackets or provided with ribs for thinner brackets, comprises two pairs of rectangular slots 36, 38 and 40, 42, into which are inserted half-cylindrical hinges 44 and 46 of the plates 14 and 16 of the connectors, and two oblong recesses 45 and 47 suited to fasten the bracket 12 to some frame member (not shown). Any plate 14 or 16 comprises steps 48 and 50 of which the step 48 separates the respective planes 18 and 20, while the step 50 has a stiffening function for the plane 18, possibly operating also as support for frames of indicating tags. Further, the step 48 can have one or more holes (for example 49*a,* 49*b,* 49*c*) for passing tools acting for the fastening and lifting of the plates 14 and 16 with respect to the bracket 12.

As already mentioned, the plates 14 and 16, operating as supports for the fixed connectors, have to be easily disengaged from the bracket 12 in order to make checks and repairs under them. To this purpose any plate 14 and 16 is provided with bevelled fingers 52 and 54 abutting against the wall 30 of the bracket 12 and provided with means allowing at least the fastening of the plates 14 and 16 to the bracket 12 and, possibly, a controlled lifting of the plates 14 and 16 by rotation around the half-cylindrical hinges 44 and 46, being said means, embodied in a plurality of ways, depicted in the following figures.

Figure 6:
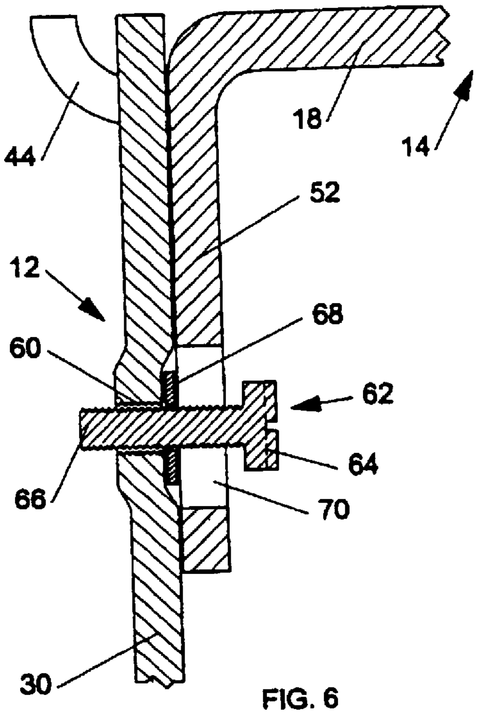
FIG. 6 is a side cross-section view of first screw fastening means comprising a screw engaged in a threaded hole open through the bracket and crossing an oblong slot into the plate.
Figure 7:
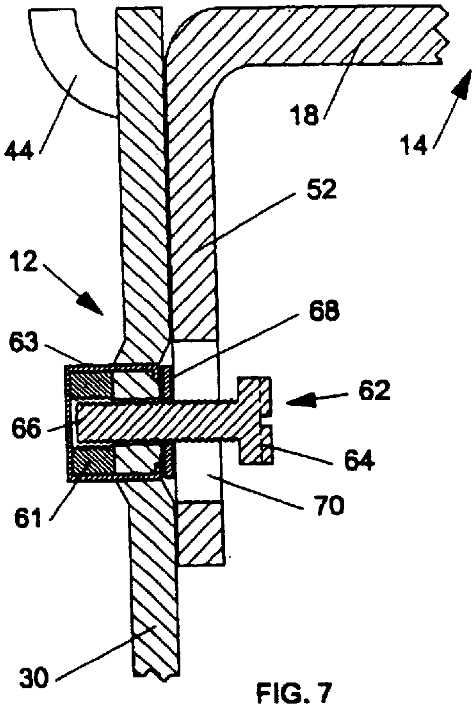
FIG. 7 is a side cross-section view of second screw fastening means comprising a screw engaged in an encased nut fastened to the bracket and crossing an oblong slot into the plate.
Figure 8:
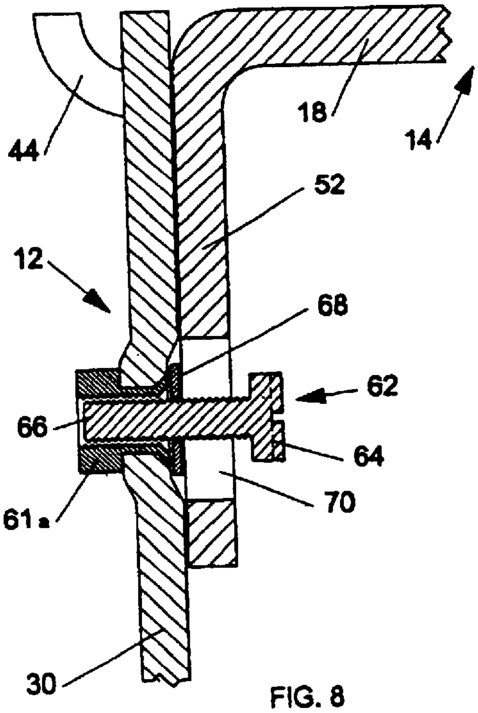
FIG. 8 is a side cross-section view of third screw fastening means comprising a screw engaged in an inserted and riveted nut fastened to the bracket and crossing an oblong slot into the plate.

In FIGS. 6 to 8 are depicted simple, fastening means comprising essentially a screw engaged in a corresponding threaded hollow member.

In particular, in FIG. 6 it is seen that the wall 30 of the bracket is provided with a threaded hole 60 engaging a screw 62 comprising a head 64 and a threaded shank 66 provided with a washer 68 preventing any possible loss of the screw 62. The screw 62 crosses an oblong slot 70 through the bevelled finger 52 to allow a rotation of the plate 18 around the hinges 44 and 46 when the screw 62 is loosened, as shown in FIG. 6.

In FIG. 7 is seen a fastening system also comprising a screw 62, however engaged in a nut 61 of the kind encased in a cage 63 fastened to the wall 30 of the bracket 12.

In FIG. 8 is seen another similar system comprising the screw 62 engaged in a riveted nut. The remainder of the figure is identical to FIG. 6 where the screw 62 has the same function. The nuts 61 and 61*a* of the FIGS. 7 and 8 ensure higher fastening strength of he screw 62 with respect to the simple threaded hole depicted in FIG. 6.

Figure 9:
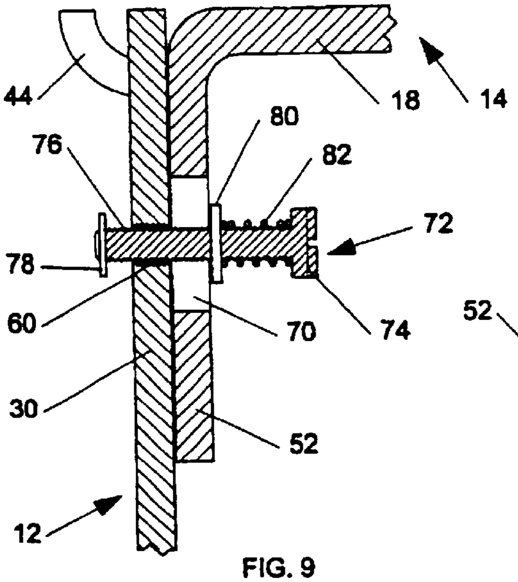
FIG. 9 is a side cross-section view of fourth screw fastening means comprising a driving screw, engaged in a threaded hole open through the bracket and provided with a spring between the head thereof and a washer abutting on the plate to provide a resilient reaction to the lifting of the plate with respect to the bracket.
Figure 10:
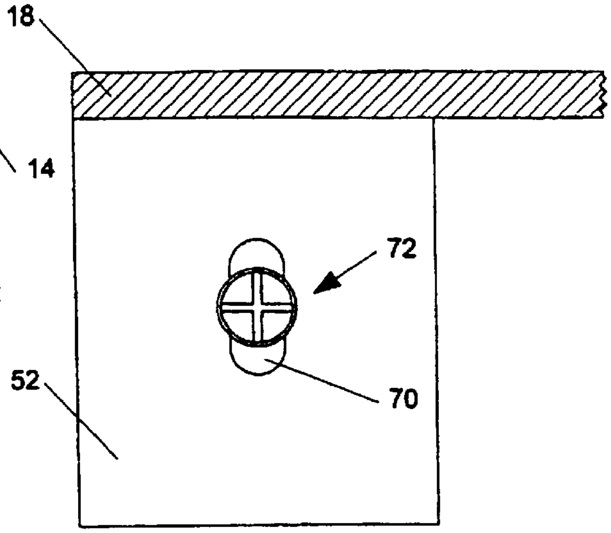
FIG. 10 is a front view of the fastening means depicted in FIG. 9.

The FIG. 9 is a cross-section view of further fastening means, similar to FIG. 6, in which a long screw 72, provided with head 74 and threaded shank 76, is engaged in a threaded hole 60 open through the wall 30 of the bracket 12. The shank 76 of the screw 72 crosses an oblong slot 70 through the bevelled finger 52 of the plate 14, allowing rotating movement of plate 14 around the hinges, such as the hinge 44 visible in the figure when the screw 72 is extended enough. The screw 72 is provided at the end of the threaded shank 76, farthest from the head 74, with a Seger washer for locking the screw itself in a most unscrewed position. On the shank 76 are inserted a washer 80 and an axial spring 82 which, according to the tightening of the screw 72, provides a more or less strong pressure on the bevelled finger 52 of the plate 14, so that, when the screw 72 is at most loosened, it provides a directing function to the plate 14, in order to avoid exit of the hinges 44, 46 from the slots 36, 38 of the wall 30 of the bracket 12, and at the same time allows some lifting rotation of the plate 14. On the contrary, when the screw 72 is at most tightened, the spring 82 is compressed giving a sufficient resilient strength to the bevelled finger 52 to fasten the finger 52 against the wall 30 of the bracket 12. In short, the screw 72 with the washer 80 and the spring 82 provides means for both fastening of the plate 14 to the wall 30 of the bracket 12 and directing the plate 14 when, after having loosened the screw 72, it is desirable to lift by rotation the plate for check and repair of components under the same plate. FIG. 10 shows in front as are arranged the screw 72 and the oblong slot 70.

Figure 11:
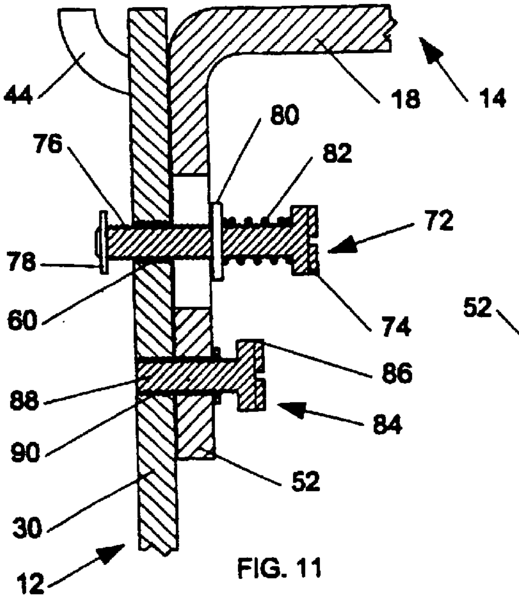
FIG. 11 is a side cross-section view of fifth screw fastening means comprising a screw engaged in a threaded hole of the bracket, crossing an oblong slot into the plate and provided with a spring, as in FIG. 9, with in addition a screw, for stiff fastening the plate to the bracket, engaged in a threaded hole present in the same bracket.
Figure 12:
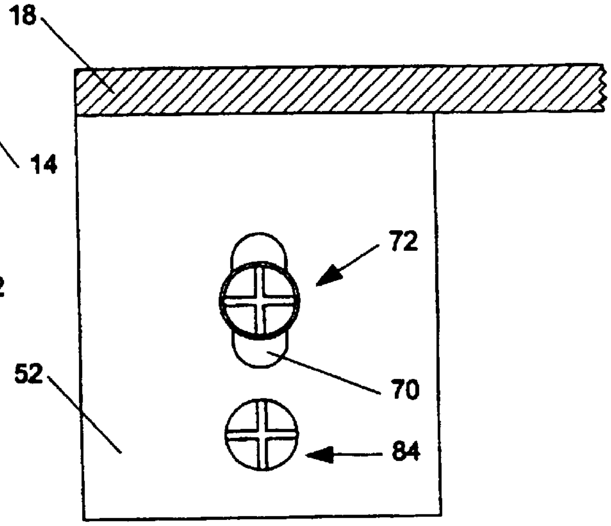
FIG. 12 is a front view of the fastening means depicted in FIG. 11.

FIG. 11 and FIG. 12 show another fastening and directing solution of the plate 14 in which to the screw 72 is left just a directing duty, while the fastening duty is provided by another screw 84 provided with head 86 and threaded shank 88 engaged in a threaded hole 90 through the wall 30. In such a case, the screw 72 can be left always loosened, giving it the simple duty of directing the plate 14, while by tightening the screw 84 a complete fastening of the bevelled finger 52 against the wall 30. Of course, to lift the plate 14 with respect to the bracket 12, it is necessary to loosen the screw 84, by completely disengaging it from the threaded hole 90.

Figure 13:
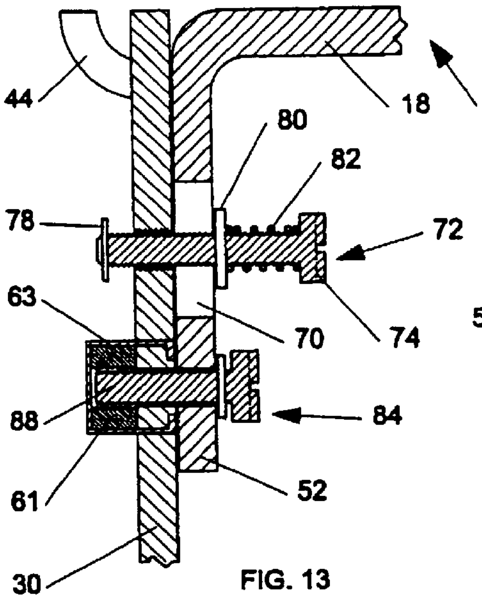
FIG. 13 is a side cross-section view of sixth screw fastening means, similar to FIG. 11, with the difference that the screw for rigid fastening is engaged by an encased nut.
Figure 14:
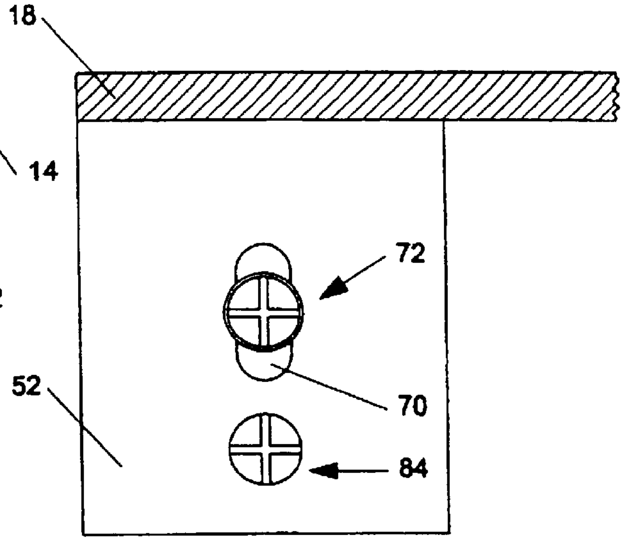
FIG. 14 is a front view of the fastening means depicted in FIG. 13.

FIGS. 13 and 14 show a further fastening and directing solution of the plate 14 in which the screw 84 engages the threaded shank 88 in a nut 61 held in touch with the wall 30 by means of a cage 63 in analogy with the solution shown in FIG. 7. Of course, the screw 72 with the spring 82 has the same directing function of the screw 72 of the solutions depicted in FIGS. 9, 10, 11 and 12.

Figure 15:
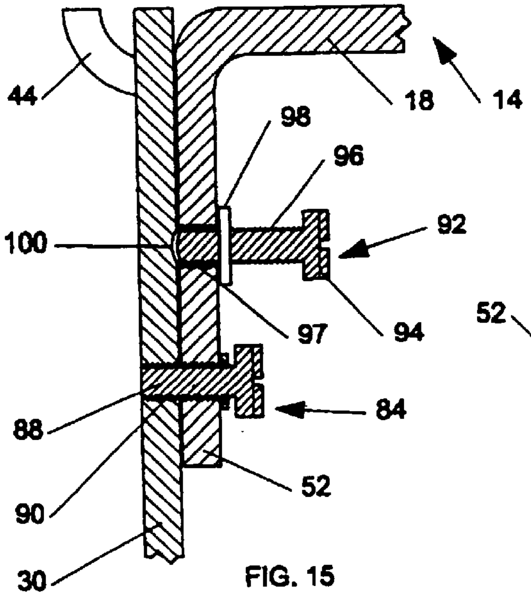
FIG. 15 is a side cross-section view of seventh fastening means comprising, besides a screw for rigid fastening of the plate on the bracket, depicted in FIG. 6, a lifting screw engaging a threaded hole in the plate and abutting against a seat in the bracket.
Figure 16:
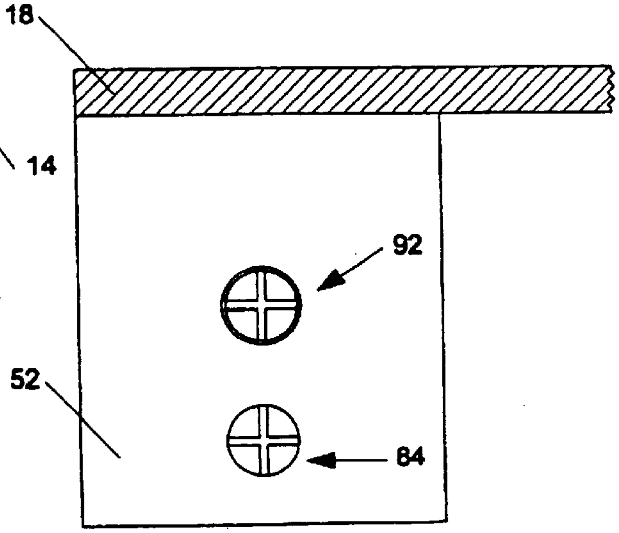
FIG. 16 is a front view of the fastening means depicted in FIG. 15.

FIGS. 15 and 16 show a solution using a screw 84 for firmly fastening the finger 52 to the wall 30 and a screw 92 for making a stable lifting of the plate 14 with respect to the bracket 12. The screw 84 is the same of FIG. 11, with the same components and the same functions, so that does not need any additional explanation, while the screw 92, provided with head 94 and shank 96, is engaged in a threaded hole 97 open in the finger 52, is provided with a possible washer 98 against lost and abuts against a seat 100 open in the wall 30 for providing a support allowing the above mentioned solid lifting of the plate 14 when the screw 92 is tighten. Of course, a loosening of the screw 92 makes a drop of the finger 52 for causing the screw 84 to insert the shank 88 in the threaded hole 90 of the wall 30.

Figure 17:
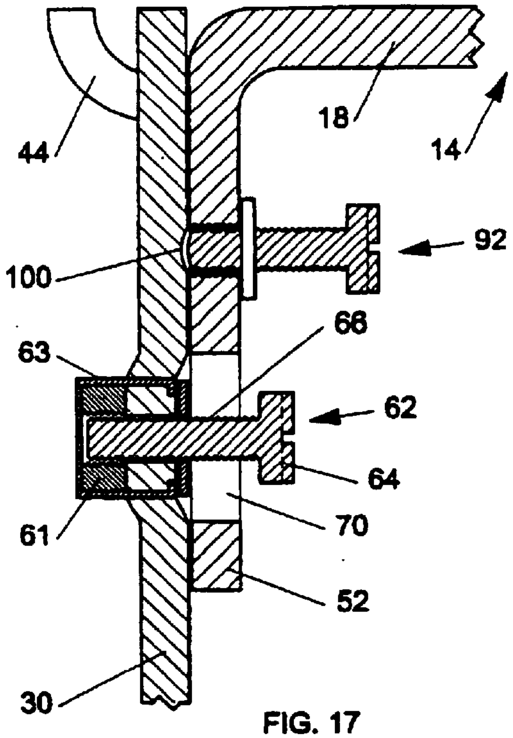
FIG. 17 is a side cross-section view of eighth fastening means comprising, besides a screw for rigid fastening of the plate on the bracket engaging an encased nut fastened to the bracket, as depicted in FIG. 7, a lifting screw engaging a threaded hole in the plate and abutting against a seat in the bracket.

FIG. 17 shows a variation of the solution of FIGS. 15 and 16 in which a screw 62, engaged in an encased nut 61, crosses an oblong slot 70 in the finger 52, so that when the screw 92 pushes to lift the plate 14, the shank 66 of the screw 62 can follow the rotation lifting of the finger 52.

Figure 18:
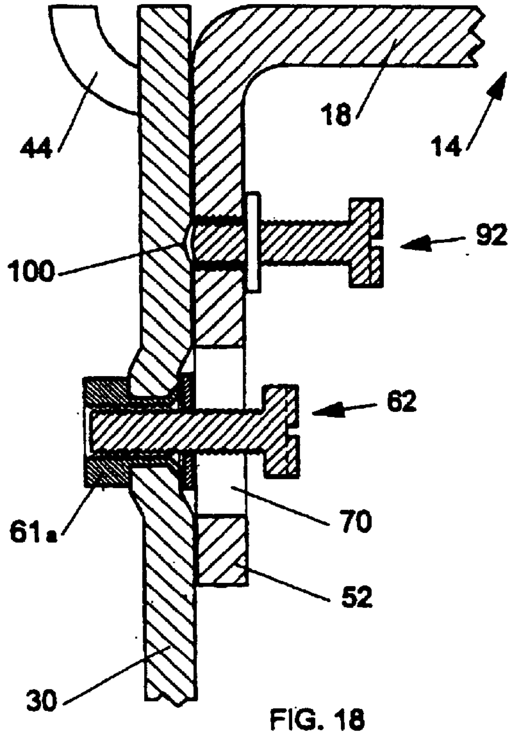
FIG. 18 is a side cross-section view of ninth fastening means comprising, bedsides a screw for rigid fastening of the plate on the bracket engaging a nut riveted to the bracket, as depicted in FIG. 8, a lifting screw engaging a threaded hole in the plate and abutting against a seat in the bracket.

FIG. 18 is completely similar to FIG. 17 with just the exception that, instead of the encased nut 61, a riveted nut **61*a*** is used.

Figure 19:
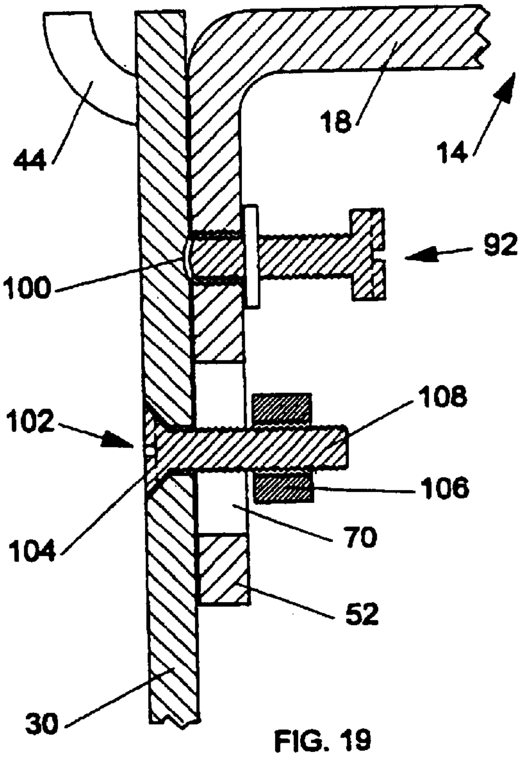
FIG. 19 is a side cross-section view of tenth fastening means comprising a rigid fastening of the plate against the bracket consisting in a threaded stud bolt, inserted in the bracket, providing to fasten, by means of a nut, the plate against the bracket and a lifting screw engaging a threaded hole in the plate and abutting against a seat in the bracket.

FIG. 19 shows a solution in which instead of the screw 62 of the FIGS. 17 and 18, a stud bolt 102 is used comprising a head 104 and a threaded shank 108 inserted in an oblong slot 70 of the finger 52 and engaged by a nut 106 which, by a means, such as a pipe spanner, can fasten the finger 52 against the wall 30. The screw 92 provides the usual lifting by rotation of the finger 52.

Figure 20:
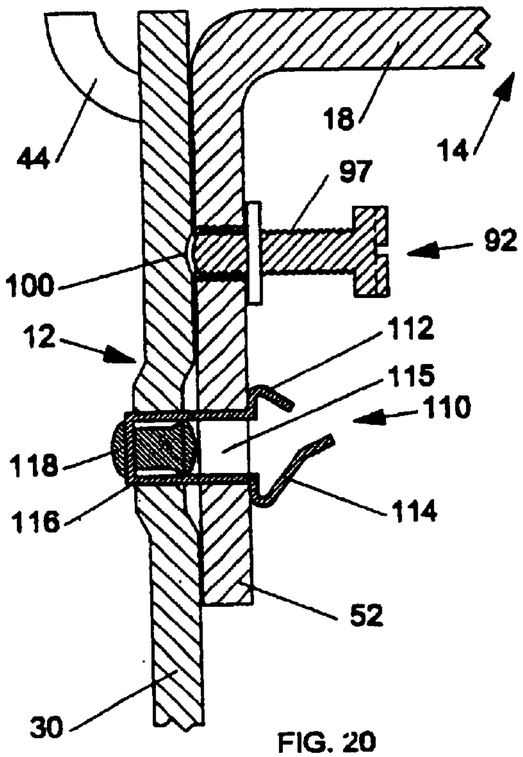
FIG. 20 is a side cross-section view of eleventh fastening means comprising a double resilient tang, fastened to the bracket, engaged in a corresponding closed slot of the plate and a lifting screw engaging a threaded hole in the plate and abutting against a seat in the bracket.

FIG. 20 shows a solution in which to fasten the finger 52 to the wall 30 are used resilient fastening means 110 comprising two resilient shaped tangs 112 and 114, which are different in length for reasons of the rotating movement of the finger 52 around the hinge 44, engaged in a window 115 open in the finger 52. The two fingers 112 and 114 form just one body with a bridge 116 open for the passage of a rivet 118 fixing the fastening resilient means 110 to the wall 30 of the bracket 12. A screw 92 engaged in a threaded hole 97 of the finger 52 and abutting against a seat 100 of the wall 30 provides the usual lifting by rotation of the finger 52.

Figure 21:
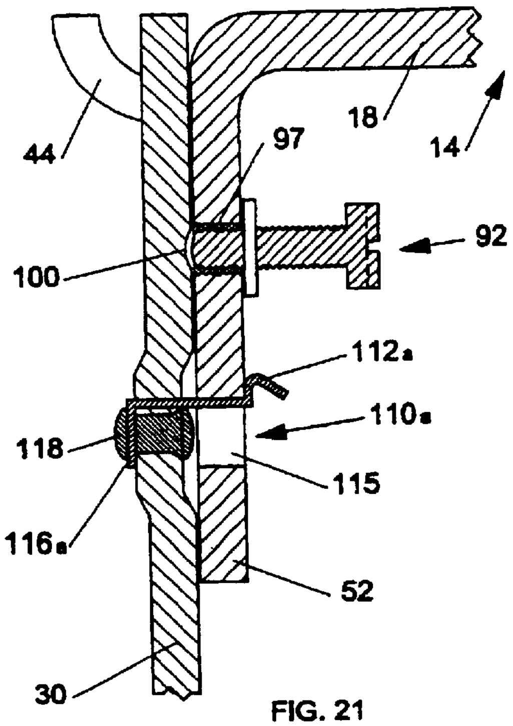
FIG. 21 is a side cross-section view of twelfth fastening means comprising a simple resilient tang, fastened to the bracket, engaged in a corresponding closed slot of the plate and a lifting screw engaging a threaded hole in the plate and abutting against a seat in the bracket.

FIG. 21 shows a solution in which to fasten the finger 52 to the wall 30 are used resilient fastening means **110*a* comprising a resilient shaped tang 112*a* engaged in a window 115 open in the finger 52. The tang 112*a* is extended in a bevelled open finger 116*a* crossed by a rivet 118 fixing the resilient fastening means 110*a* to the wall 30 of the bracket 12. The screw 92 provides the usual lifting by rotation of the finger 52**.

Figure 22:
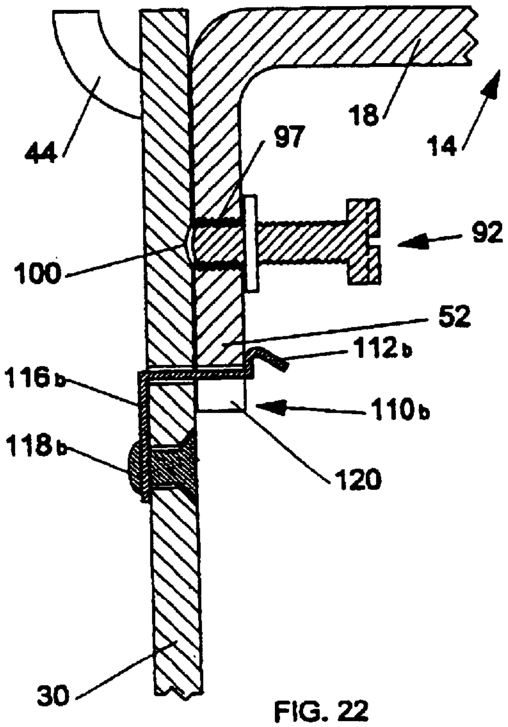
FIG. 22 is a side cross-section view of thirteenth fastening means comprising a simple resilient tang, fastened to the bracket, engaged in a corresponding open slot or recess of the plate and abutting against a seat in the bracket.

FIG. 22 shows an alternative solution, similar to FIG. 21, with only the difference that resilient fastening means **110*b*, comprising a tang 112*b*, extended in a open bevelled finger 116*b* fixed by means of a rivet 118*b* to the wall 30, engaging a recess 120, open along a side. The screw 92 provides the usual lifting by rotation of the finger 52**.

Figure 23:
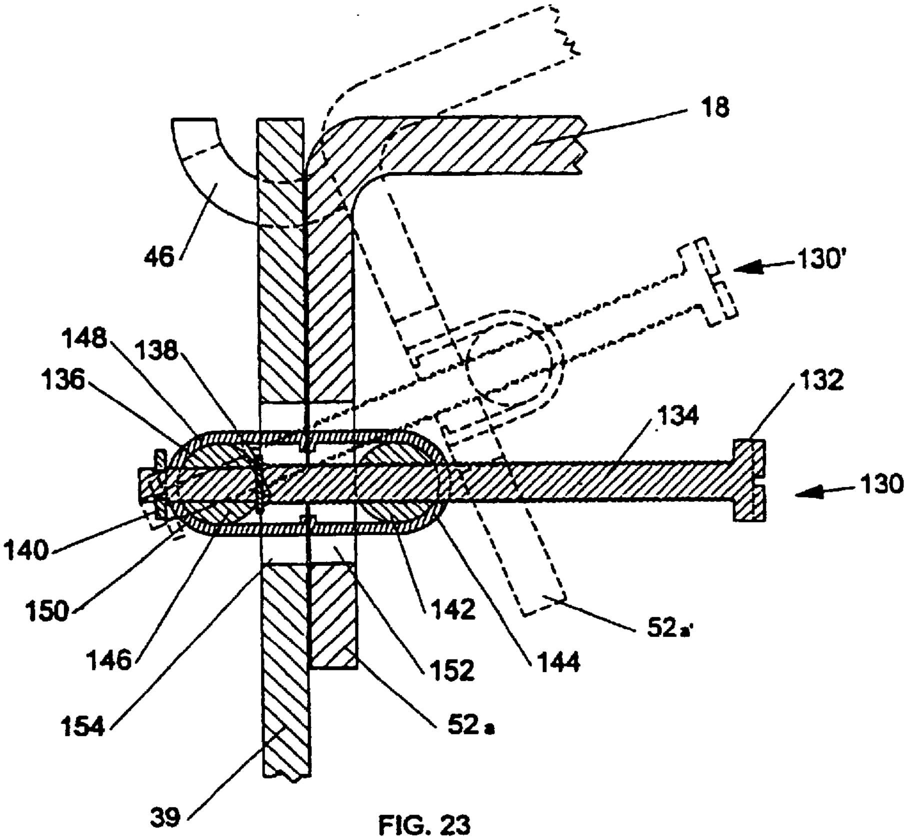
FIG. 23 is a side cross-section view of fourteenth fastening means consisting of just one screw means and cylindrical articulations operating both as a lift of the plate with respect to the bracket when it is rotated in a first direction and as fastening of the plate against the bracket, when it is rotated in the opposite direction.
Figure 24:
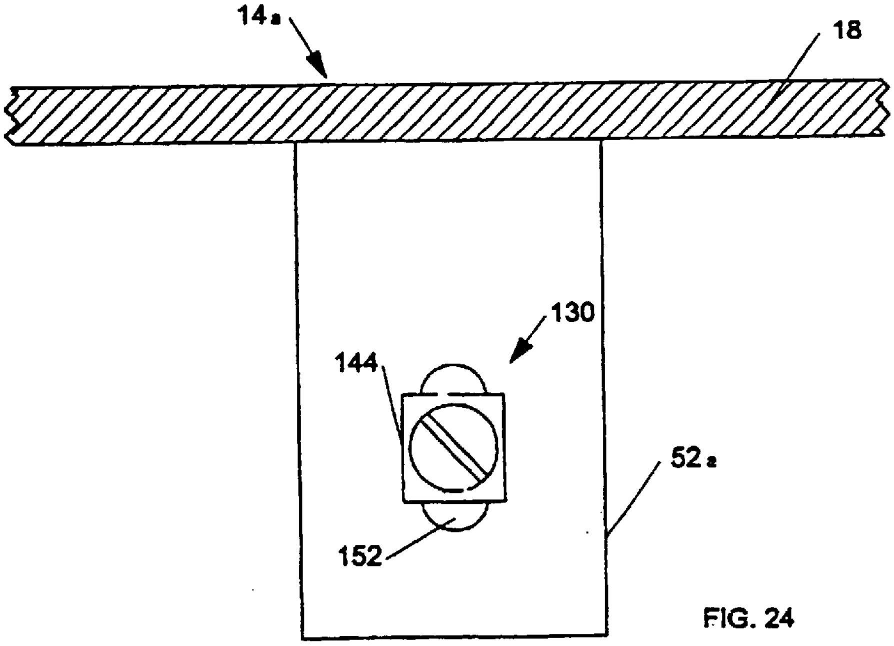
FIG. 24 is a front view of the fastening means depicted in FIG. 23.

FIG. 23 shows a particular solution comprising just one screw means and cylindrical articulations operating both as a lift of the plate 14 with respect to the bracket 12 and as fastening of the same plate 12 against the bracket 12. The above mentioned screw and cylindrical articulation means consists of a special screw 130 comprising a head 132, a first portion of threaded shank 134 extended in a second smooth portion 136 of smaller diameter bounded by two Seger washers 138 and 140. The threaded shank 134 is engaged in a threaded hole of a first cylinder 142, which is fastened to the finger 52 by a cage 144. The smooth shank 136 of smaller diameter is engaged in a corresponding smooth hole of a second cylinder 146, fastened by a cage 148 to a finger 39 of the bracket 12, as it is visible in the subsequent FIG. 25. The cage 148 is provided with a window 150 through which passes the shank 136 with the Seger washer 140. Both the finger **52*a* and the finger 39 are provided with respective oblong slot windows 152 and 154 having the duty to prevent forcing of the shanks 134 and 136 of the special screw 130 during the lifting movement of the plate 14 with respect to the bracket 12, as visible in the shaded line representation of the same finger having numeral 52*a'*, with the screw having the numeral 130'. It results obvious with this particular solution that, when the screw 130 is rotated to be lightened, it moves the first cylinder 142 far from the finger 39 of the bracket 12, as the Seger washer 138, fastened to the shank 136, abuts against the second cylinder 146 retained by the cage 148 against the finger 39. It results that the cage 144 of the cylinder 142 trails in lifting rotation the finger 52*a*. On the contrary, when the screw 130 is rotated for loosing, the first cylinder 142 is pushed against the finger 39 of the bracket 12 while the Seger washer 140 retains the shank of the screw 130 against the second cylinder 146, so that the finger 52*a* of the plate 14 is pushed against the finger 39 of the bracket 12 till stopping against it, as indicated by the full line depiction of FIG. 23**.

Figure 25:
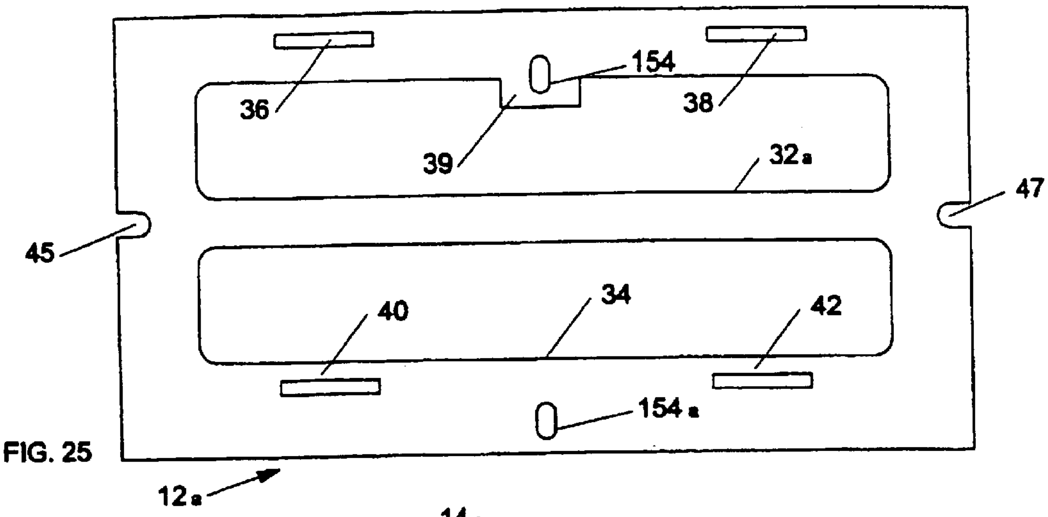
FIG. 25 is a front view of cable directing bracket suitable for a plate for connectors of the FIGS. 23 and 24.
Figure 26:
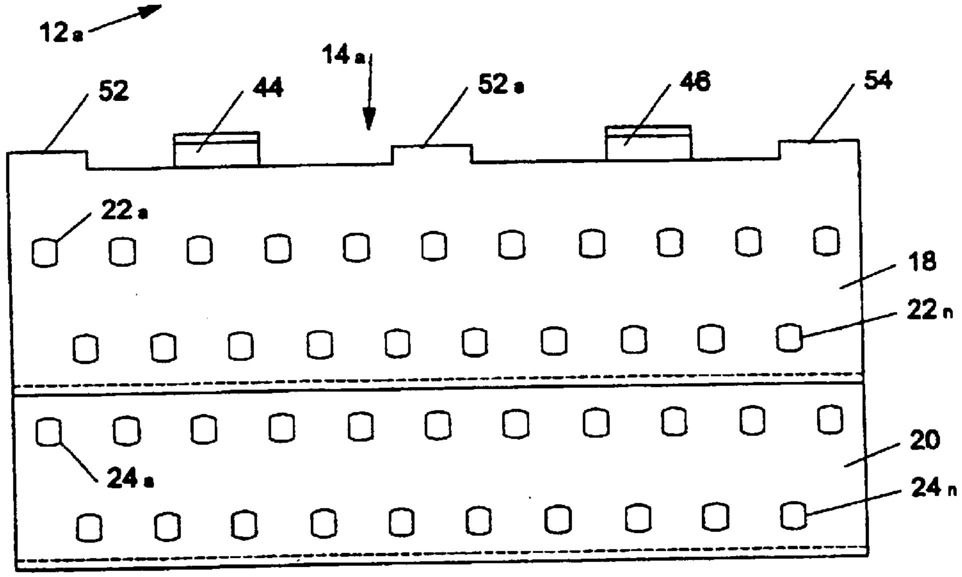
FIG. 26 is a top view of one of the plates for supporting connectors to be coupled to the cable bracket of FIG. 25.
Figure 27:
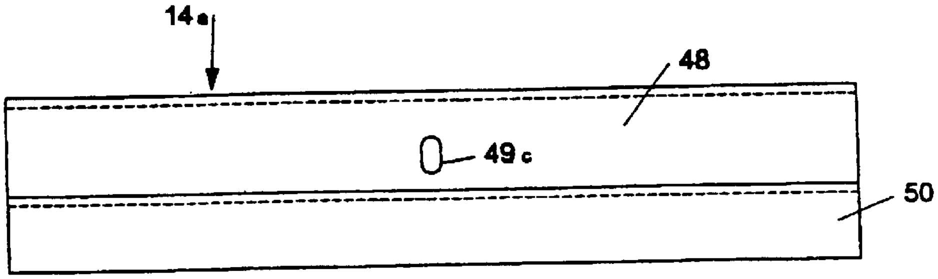
FIG. 27 is a front view of a plate for connectors to be used with the fastening means of the FIGS. 23 and 24.

In order to have the lifting and fastening depicted in FIG. 23 easily operating, it needs to use no more than one of it for every plate 14 and 16 mounted on the bracket 12 and both he bracket 12 and the plates 14 and 16 have to be modified as depicted in the FIGS. 25, 26 and 27.

Referring to the above mentioned Figures, it is seen that a bracket 12*a* is similar to the bracket 12 of the FIG. 2 with the exception of a finger 39 located midway the upper side of a rectangular window 32*a,* corresponding to the window 32 of the FIG. 2, and two oblong slot windows 154 and 154 aligned with the middle of the finger 39. The finger 39 operates for the self-evident purpose of providing support to the second cylinder 146 of the lifting and fastening means of FIG. 23. Looking now at FIGS. 26 and 27, it is seen that a plate 14*a* is similar to the plate 14 depicted in FIGS. 3 and 4 with the exception of an auxiliary finger 52*a,* having the purpose of engaging the first cylinder 142 of the lifting and fastening means of FIG. 23, and of only one hole 49*c* on the step 48 to gain access to the head 132 of the screw 130.

Figure 28:
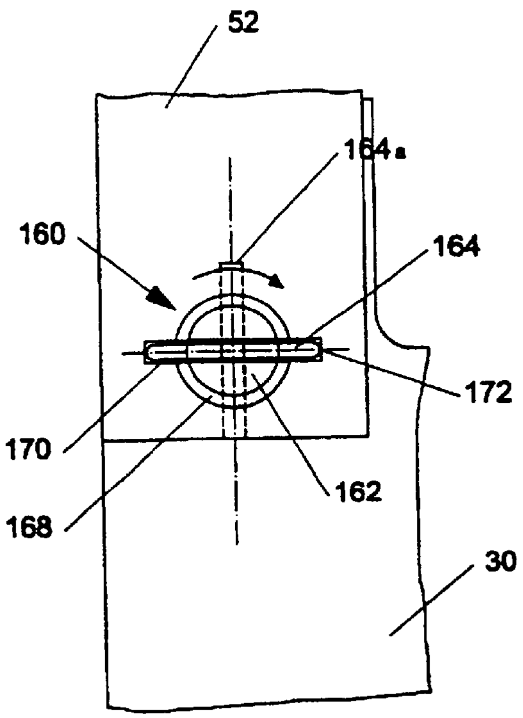
FIG. 28 is a front view of latch fastening means comprising a turning cylindrical body, fastened to the bracket, and provided with a key to be passed through a cylindrical hole provided with diametrically opposed slots to allow the passing of the key, but permitting an engagement of the key with the plate when the cylindrical body is turned, for example by 90°.
Figure 29:
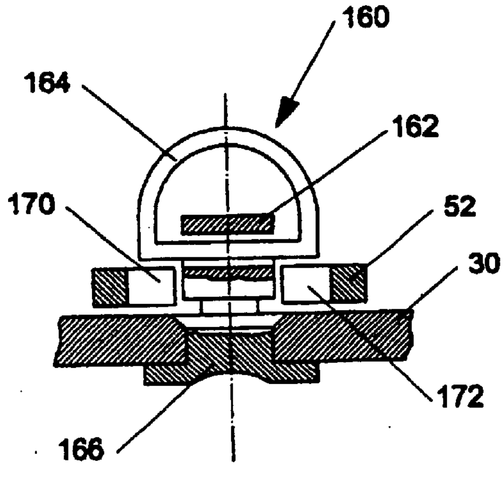
FIG. 29 is a side cross-section view of the fastening means depicted in FIG. 25.

Reference is made to FIGS. 28 and 29 depicting first latch fastening means of the finger 52 of the plate 14 against the wall 30 of the bracket 12. This latch 160 consists of a cylindrical body 162 provided with a key 164 allowing to rotate it around a support 166 riveted in the wall 30. The cylindrical body 162, with the key 164, passes through a hole 168 provided with diametrical slots 170 and 172 allowing the crossing of the latch 160 through the finger 52, when it is located as shown by full lines in the FIG. 28, while locks the finger 52 against the wall 30 by a 90° rotation to reach the position indicated by 164*a* in the same FIG. 28. Of course, this latch fastening means can be associated to a lifting screw, such as the screw 92 depicted in the FIGS. 15 to 22.

Figure 30:
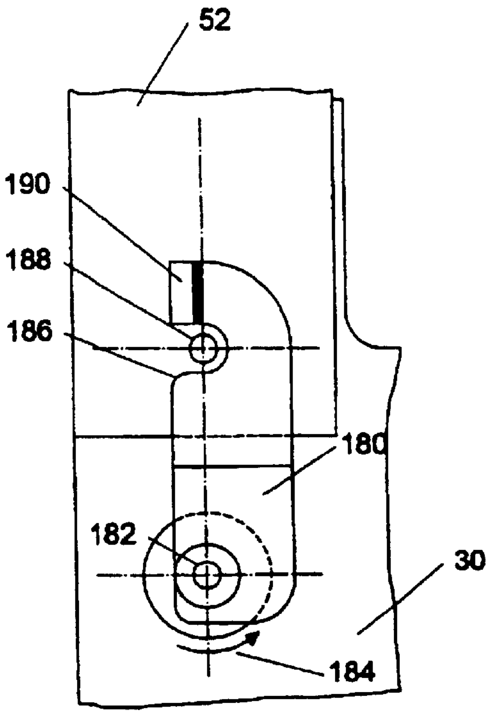
FIG. 30 is a front view of latch fastening means comprising a bridge, pivoted on the bracket, engaging a relief of the plate.

FIG. 30 depicts a second latch fastening means of the finger 52 of the plate 14 against the wall 30 of the bracket 12 consisting of a bridge 180, turning around a pivot 182, fastened to the wall 30, which once turned in the direction indicated by the arrow 184, brings a recess 186 thereof to embrace a pin 188 fastened to the finger 52. A fin 190 coming from the bridge 180 and forward protruding, moves the bridge 180 to reach the two respective engaged and, disengaged positions for fastening and release the finger to and from the wall 30.

Figure 31:
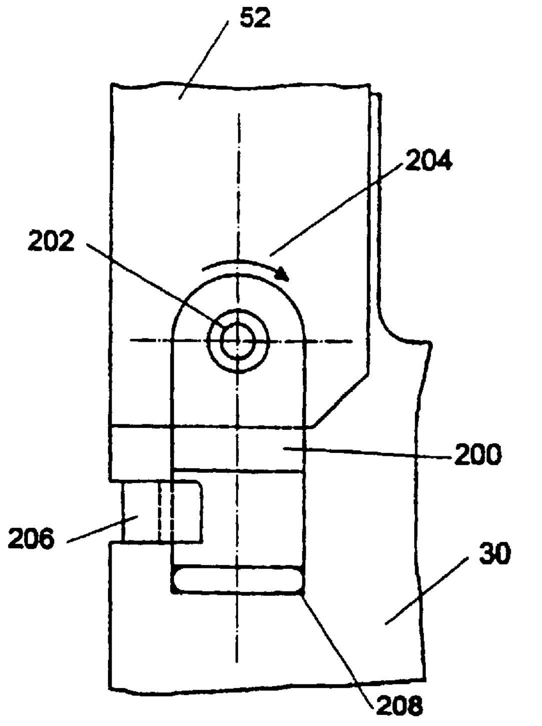
FIG. 31 is a front view of latch fastening means comprising a bridge, pivoted on the plate, engaging a relief of the bracket.

FIG. 31 depicts another latch fastening means of the finger 52 of the plate 14 against the wall 30 of the bracket 12 consisting of a bridge 200 turning around a pivot 202 fastened to the finger 52 which, when moved according the direction indicated by the arrow 204, engages a tooth 206 extending from the wall 30, remaining retained under the same tooth 206. A rotation in opposite direction of the bridge 200 releases it from the tooth 206, so releasing the finger 52 from the wall 30.

Figure 32:
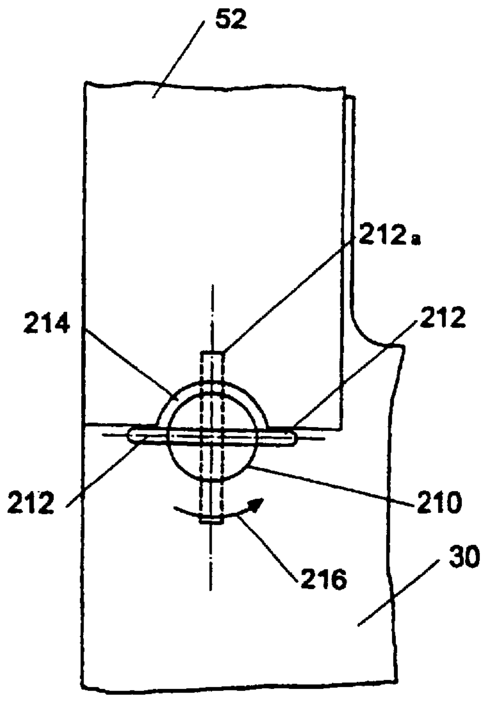
FIG. 32 is a front view of latch fastening means comprising a turning cylindrical body, pivoted on the bracket, to be engaged in a semicircular recess in the plate.

FIG. 32 depicts a third latch fastening means of the finger 52 of the plate 14 against the wall 30 of the bracket 12 consisting of a key 210, provided with fins 212, filling a half-circular recess 214 of the finger 52, which, when rotated by 90° in the direction indicated by the arrow 216, reaches the position 212*a* engaging the finger 52 of the plate 14.

Figure 33:
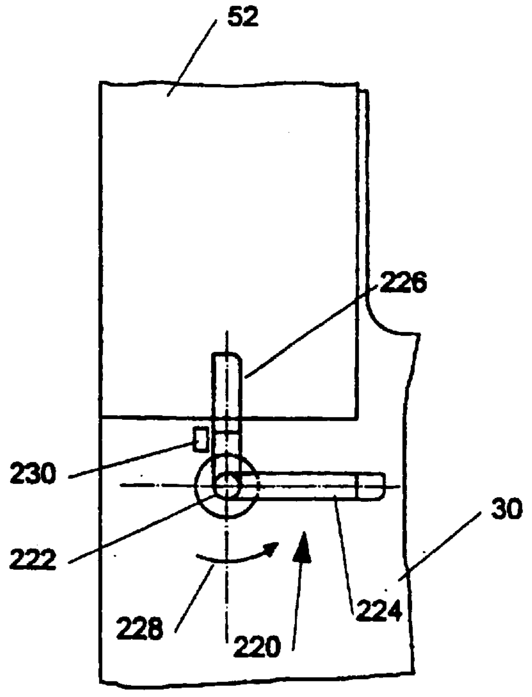
FIG. 33 is a front view of latch fastening means comprising a turning bevel lever pivoted on the bracket and suited to be rotated for engaging a leg thereof with the plate.

FIG. 33 depicts a fourth latch fastening means of the finger 52 of the plate 14 against the wall 30 of the bracket 12 consisting of a bevelled lever 220, turning around a pivot 222, fastened to the wall 30, comprising a first leg 224 and a second leg 226. The bevelled lever 220 can rotate in the direction of the arrow 228 to have the leg 226 passing over the finger 52, stopping against a tooth 230 arranged on the wall 30 (but could also be arranged on the finger 52). As depicted in the FIG. 33, if the bevelled lever 220 were rotated in the direction reversed with respect to the arrow 228, should release the finger 52 from the wall 30, so releasing the plate 14 from the bracket 12.

Figure 34:
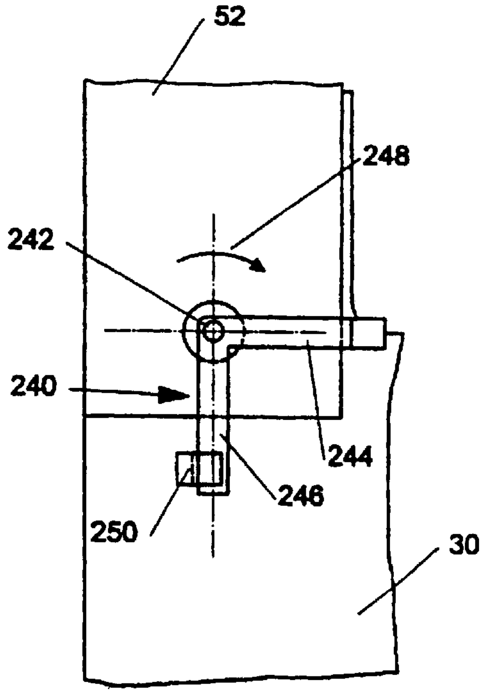
FIG. 34 is a front view of latch fastening means comprising a turning bevel lever pivoted on the plate and suited to be rotated for engaging a leg thereof with the bracket.

FIG. 34 depicts a fifth latch fastening means of the finger 52 of the plate 14 against the wall 30 of the bracket 12 consisting of a bevelled lever 240, turning around a pivot 242, fastened to the finger 52, comprising a first leg 244 and a second leg 246 which, when the lever 240 rotates in the direction indicated by the arrow 248, engages a stopping hook 250 fastened to the wall 30 of the bracket 12, so ensuring the fastening of the finger 52 to the same wall 30. Of course, a rotation of the lever 240 in reverse direction with respect to the arrow 248 releases the leg 246 from the stopping hook 250, releasing the finger 52 from the wall and thus the plate 14 from the bracket 12.

What has been here above disclosed describes just some embodiments of the present invention and it will be easy to those skilled in this art to devise, after having read the preceding description, similar and equivalent solutions to be held as covered by the enclosed claims.

For example, the lifting screws 92 do not have necessarily to be equal in number to the fastening means of the fingers 52 of the plates 14 to the wall 30 of the bracket, as it is possible to have just one lifting screw for any plate 14 and being this solution also simpler and more practical than the solution having two lifting screws 92, because with just one screw is avoided the danger of a not uniform lifting of the plate 14. Also, the bracket 12*a* depicted in FIG. 25 with the auxiliary finger 39 and corresponding holes under the FIGS. 52 and 54 could be universally used for all the connecting structures 10 according to the present invention.

Further, the solution with just the one screw and cylindrical articulation means depicted in FIG. 23 could be reversed with the first cylinder 142 provided with a smooth hole and the second cylinder 146 provided with a threaded hole. This reversal should have the advantage of protruding the screw 130 behind the wall 30 of the bracket 12 instead than in front of the finger 52, as it appears in the FIG. 23.

What is claimed is:

1. A connecting structure for electric or electronic systems comprising an essentially rectangular bracket including:

two superimposed windows for directing cables connected to connectors;

two pairs of slots substantially parallel to one of the longest sides of the bracket, each pair of slots for engaging two half-cylindrical hinges present on a longest side of a plate, supporting the connectors, adjacent the bracket;

means for fastening the plate to the bracket; and means to lift the plate with respect the bracket to expose an area under the plate, usually hidden, in order to promote checking and servicing thereof.

2. The connecting structure as in claim 1, wherein the means for fastening the plate to the bracket are two in number and are outside arranged with respect to the two slot pairs provided for engaging the hinges.

3. The connecting structure as in claim 2, wherein the means for fastening any plate to the bracket includes screws engaged in threaded members connected to the bracket, each screw crossing an oblong hole in a finger of the plate adjacent the bracket.

4. The connecting structure as in claim 1, wherein between heads each of the screws and the fingers of the plate are positioned a spring and a washer, the spring resting on the washer and operating as resilient return for closing the plate against the bracket.

5. The connecting structure as in claim 1, wherein one means operates in a first direction as a means to lift the plate with respect to the bracket, and operates in an opposed direction as a means for fastening the plate to the bracket.

6. The connecting structure as in claim 1, wherein the means for fastening the plate to the bracket can be resilient tang means fastened to the bracket and interfering with slots in the plate.

7. The connecting structure as in claim 1, wherein the means for fastening the plate to the bracket can be latch means arranged on the bracket and engaging at least a shaped hole in the plate.

8. The connecting structure as in claim 1, wherein the means for fastening the plate to the bracket can be latch means arranged on the bracket and engaging a relief arranged on the plate.

9. The connecting structure as in claim 1, wherein the means for fastening the plate to the bracket can be latch means arranged on the bracket and engaging a relief arranged on the same bracket.

10. The connecting structure as in claim 1, wherein the means for fastening the plate to the bracket can be latch means arranged on the plate and engaging a relief arranged on the bracket.

* * * * *